United States Patent [19]

Ovshinsky et al.

[11] Patent Number: 4,753,675
[45] Date of Patent: Jun. 28, 1988

[54] METHOD OF PREPARING A MAGNETIC MATERIAL

[75] Inventors: Stanford R. Ovshinsky, Bloomfield Hills; Stephen J. Hudgens, Southfield; David D. Allred, Troy; Gregory DeMaggio, Bloomfield Hills; Russell C. Custer, Clawson, all of Mich.

[73] Assignee: Ovonic Synthetic Materials, Inc., Troy, Mich.

[21] Appl. No.: 920,018

[22] Filed: Oct. 17, 1986

[51] Int. Cl.$^4$ ............................................... C22B 1/00
[52] U.S. Cl. ............................... 75/0.5 AA; 75/0.5 A; 75/0.5 B; 75/0.5 BA
[58] Field of Search ............ 75/0.5 AA, 0.5 A, 0.5 B, 75/0.5 BA

[56] References Cited

U.S. PATENT DOCUMENTS

| | | | |
|---|---|---|---|
| 2,686,714 | 8/1954 | Schlecht | 75/0.5 AA |
| 3,690,963 | 9/1972 | Spink | 75/0.5 B |
| 3,846,117 | 11/1974 | Gardon | 75/0.5 AA |
| 3,989,512 | 11/1976 | Sayce | 75/0.5 B |
| 4,076,640 | 2/1978 | Forgensi | 75/0.5 B |
| 4,162,914 | 7/1979 | Cremer | 75/0.5 B |
| 4,390,368 | 6/1983 | Houck | 75/0.5 BB |
| 4,431,164 | 2/1984 | Jungo | 75/0.5 AA |

*Primary Examiner*—Peter D. Rosenberg

*Attorney, Agent, or Firm*—Richard M. Goldman; Marvin S. Siskind

[57] ABSTRACT

A method of forming a magnetic material. The magnetic material is a solid mass of grains, and has magnetic parameters characterized by: (1) a maximum magnetic energy product, $(BH)_{max}$, greater than 15 megagauss-ersteds; and (2) a remanence greater than 9 kilogauss. The magnetic material is prepared by a two step solidification, heat treatment process. The solidification process is carried out by growing microwave powder or snow. The microwave powder or snow is grown by introducing a reaction gas comprised of precursor compounds of the magnetic material into a substantially enclosed reaction vessel. The reaction gas is energized by providing a source of microwave energy coupled to the substantially enclosed reaction vessel while maintaining the reaction gas pressure high enough to form the powdery microwave polymerizate, condensate, or precipitate, i.e., microwave snow. The solid particles of microwave snow have a morphology characterized as being one or more of (i) amorphous; (ii) microcrystalline; or (iii) polycrystalline. The grains within the solid have, at this stage of the process, an average grain characteristic dimension less than that of the heat treated magnetic material. In the second, or heat treating, stage of the process, the atomized solid particles are heat treated to form a solid material comprised of grains meeting at grain boundaries. The grains and grain boundaries have the morphology of the magnetic material.

16 Claims, 2 Drawing Sheets

METHOD OF PREPARING A MAGNETIC MATERIAL

FIELD OF THE INVENTION

The invention relates to permanent magnetic alloy materials and methods of preparing them.

BACKGROUND OF THE INVENTION

There has long been a need for a relatively inexpensive, strong, high performance, permanent magnet. Such high performance permanent magnets would be characterized by relatively high magnetic parameters, e.g. coercive force ($H_c$) or coercivity, remanent magnetization or remanence, and maximum energy product.

Moreover, an ideal high-performance permanent magnet should exhibit a square magnetic hysteresis loop. That is, upon application of an applied magnetic field H greater than the coercive force Hc, all of the microscopic magnetic moments should align parallel to the direction of the applied force to achieve the saturation magnetization Ms. Moreover, this alignment must be retained not only for H=0 (the remanent magnetization Mr), but also for a reverse applied magnetic force of magnitude less than Hc. This would correspond to a maximum magnetic energy product (the maximum negative value of BH) of $$(M_r^2/4) = (M_s^2/4)$$

Unfortunately, this ideal situation is at best metastable with respect to the formation of magnetic domains in other directions, which act to reduce Mr and $BH_{max}$.

Conventional high-performance permanent magnets that approach square-loop behavior have four general requirements:

1. The material must be composed primarily of a ferromagnetic element or compound with a Curie temperature Tc that significantly exceeds the application temperature Ta, and with Ms at Ta large. Practically speaking, this requires either Fe or Co as the major constituent.
2. In order to obtain a high coercive force, the material must consist of an assembly of small particles or crystallites.
3. These particles or crystallites must exhibit microscopic magnetic anisotropy, i.e. they must have a preferred "easy axis" of magnetization. This can follow either from shape anisotropy or magneto-crystalline interaction.
4. These microscopically anisotropic particles must be aligned substantially in parallel within the macroscopic assembly, in order to achieve values of Mr that approach Ms, i.e. square-loop behavior.

The prior art teaches that good permanent magnetic materials, e.g., having maximum magnetic energy products of about 15 megagaussoersteds, consist of a conglomeration of non-interacting substantially crystallographically oriented uniaxial particles. When a sufficiently large magnetic field is applied in a given direction, the individual vector magnetizations of each of these particles point along the applied field, corresponding to the maximum or saturation value of the net magnetization, $M_s$. As the applied magnetic field is reduced to zero, the vector magnetization of each particle relaxes back to the easy magnetic axis of the particle, so that the net resultant remanent magnetization, $M_r$, may be less than $M_s$.

This is more fully elucidated by the following geometrical model, in which the "easy axis" of magnetization lies along a preferred axis, c. For an isolated uniformly magnetized particle, the magnetization vector, M, lies along the c axis for a zero applied field. If a field is applied in an arbitrary direction z, the magnetization is rotated away from the c axis until, at sufficiently large fields, M is parallel to z and $M_z$ is equal to $M_s$. When the field is removed, the magnetization relaxes back parallel to the c axis, subject to the condition that the projection of magnetization along the c axis is positive.

E. C. Stoner and E. V. Wohlfarth, Phil. Trans. Royal Soc. (London), A. 240, 599 (1948) have calculated the hysteresis loop for such a particle for different orientations of the c axis with respect to z. For the case of a sample comprising a large number of such non-interacting particles oriented along some direction, the magnetic properties for the material or sample are the sum or average of the properties of the individual particles. Such a sample or material is hereinafter referred to as an anisotropic material. Anisotropic materials have at least one magnetic property which is a strong function of the direction of measurement. Such materials are characterized by a single "easy direction" of magnetization, where the value of the property greatly exceeds the value in other directions of magnetization. If the Particles are non-interacting, the maximum energy product varies from a maximum value of 0.25 $(M_s)^2$, when z is parallel to the c axis, to 0 when z is perpendicular to the c axis. For a theoretical anisotropic material with $M_s$ equal to 16 and $H_c$ chosen to be greater than $M_s$, the maximum theoretical value of the energy product of the hysteresis loop is 64 megagaussoersteds.

Stoner and Wohlfarth have carried out the same method of analysis for an ideal array of randomly oriented non-interacting uniformly magnetized particles. Since the array is isotropic there is no dependence of the hysteresis loop on the direction of the applied field. The maximum theoretical value of the energy product of such a loop is dependent on $M_s$ and $H_c$. If $M_s$ is chosen to equal 16 kilogauss and $H_c$ is chosen to be much greater than $M_s$, then the maximum energy product is 16 megagaussoersteds.

Hence, the teaching of the prior art for a perfectly oriented non-interacting material (anisotropic) is that the maximum energy product is at least four (4) times that of the same material when randomly oriented (isotropic).

For a general distribution of orientations of non-interacting particles, as a consequence of simple vector geometry, $$(M_r/M_s) = [\cos(\theta)],$$

where theta is the angle between the applied field and the easy axis of a given particle, and the result, indicated by double brackets, represents the size weighted average over all of the particles. As is well understood in the art, $M_r/M_s = 1$ along the direction of orientation of a perfectly oriented, non-interacting, permanent magnet sample (anisotropic), and $M_r/M_s = 0.5$ in all directions for a completely unoriented, non-interacting sample (isotropic). See, e.g., R. A. McCurrie, "Determination of the Easy Axis Alignment in Uniaxial Permanent Magnets for Remanence Measurements", J. Appl. Phys., Vol. 52, (No. 12), pages 7344–7346 (December 1981). Observations in the literature are consistent with this prediction. See, e.g., J. F. Herbst and J. C. Tracy, "On Estimating Remanent Magnetization from X-Ray Pole Figure Date", J. Appl. Phys., Vol. 50 (No. 6), pp. 4283–4284 (June 1979).

A figure of merit, which applicants refer to as the magnetic retention parameter, is $$Q = \mathrm{Sum}_{x,y,z}(M_r/M_s)^2,$$

where $M_s$ and $M_r$ are measured with the applied magnetic field along three orthogonal directions. Theoretically, for magnetic materials of the prior art, Q approaches 1 for perfectly oriented, non-interacting, particles or crystallites (anisotropic) and 0.75 for completely unoriented, non-interacting, crystallites (isotropic). The behavior for reported values of permanent magnetic materials of the prior art tend to produce values of Q which are substantially below the theoretical values. See, e.g., McCurrie; Herbst and Tracy; and Stoner and Wohlfarth above.

Prior art systems which are non-interacting and conform to the assumptions of and models in Stoner and Wohlfarth are described in the Background sections of commonly assigned copending U.S. application Ser. No. 816,778, filed Jan. 10, 1986, of R. Bergeron, R. McCallum, K. Canavan, and J. Keem for Enhanced Remanence Premanent Magnetic Alloy Bodies and Methods of Preparing Same, and U.S. application Ser. No. 893,516, filed Aug. 5, 1986 of R. Bergeron, R. McCallum, K. Canavan, J. Keem, A. Kadin, and G. Clemente, for Enhanced Remanence Permanent Magnetic Alloy and Bodies Thereof. The prior art materials described and discussed in the Background sections of our earlier applications do not exhibit any deviations from the assumptions and models of Stoner and Wohlfarth.

Deviations from $(M_r/M_s) = [\cos(\theta)]$ corresponding to larger values of Mr might be expected to occur if the particles were permitted to interact with one another. Suggestions of this sort have appeared in the magnetic recording literature, where the proposed interaction was due to long range magnetic dipole fields. See, for example, H. N. Bertram and A. K. Bhatia, *The Effect of Interaction on the Saturation Remanence of Particulate Assemblies*, IEEE Trans. on Magnetics, MAG-9, pp 127–133 (1983), and R. F. Soohoo, *Influence of Particle Interaction on Coercivity and Squareness of Thin Film Recording Media*, J. Appl. Phys., Vol 52(3), pp 2459–2461 (1981). However, this assumption of interactions has been questioned. See, for example, P. M. Davis, *Effects of Interaction Fields on the Hysteretic Properties of Assemblies of Randomly Oriented Magnetic or Electric Moments*, J. Appl. Phys., Vol 51 (2), pp 594–600 (1980).

Suggestions of short range interactions based on exchange have also been made with respect to amorphous iron-rare earth alloys at cryogenic temperatures by E. Callen, Y. L. Liu, and J. R. Cullen, *Initial Magnetization, Remanence, and Coercivity of the Random Anisotropy Amorphous Ferromagnet* Phys. Rev. B, Vol. 16, pp 263–270 (1977).

The literature does not contain any verified indications of enhanced values of Mr relative to those Predicted by Stoner and Wohlfarth, above, in isotropic permanent magnetic materials.

However, contrary to the limited but negative teachings of the prior art interaction between crystallites has been used to achieve enhanced magnetic properties in bulk solid materials. Magnetic materials which utilize interactions are described in commonly assigned copending U.S. application Ser. No. 816,778, filed Jan. 10, 1986, of R. Bergeron, R. McCallum, K. Canavan, and J. Keem for Enhanced Remanence Premanent Magnetic Alloy Bodies and Methods of Preparing Same, and U.S. application Ser. No. 893,516, filed Aug. 5, 1986 of R. Bergeron, R. McCallum, K. Canavan, J. Keem, A. Kadin, and G. Clemente, for Enhanced Remanence Permanent Magnetic Alloy and Bodies Thereof, both of which are incorporated herein by reference.

Described therein is a class of permanent magnetic alloys which exhibit superior magnetic properties as measured in all spatial directions, that is, isotropically. The magnetic parameters are of a magnitude which the prior art teaches to be only attainable in one spatial direction, that is, anisotropically, and to be only attainable with aligned materials.

The magnetic materials described in the incorporated patent applications have a ratio of net remanent magnetization ($M_r$) to net saturation magnetization ($M_s$), exceeding 0.5 and approaching 1.0, in all directions, without any significant preferred crystallite orientation. This is a clear violation of the consequences of the Stoner and Wohlfarth's model and the assumptions of the prior art that the grains must be microscopically anisotropic grains that are aligned substantially in parallel within the macroscopic body in order to achieve values of Mr approaching Ms, i.e., square hysteresis loop behavior.

These permanent magnetic materials have isotropic magnetic retention parameters, Q, as described above, greater than 0.75, or even greater than 1. The theoretical limit of the magnetic retention parameter, Q, for the herein contemplated materials is believed to approach 3, rather than the theoretical values of 1.0 and 0.75 respectively, for aligned (anisotropic) and unaligned (isotropic), non-interacting materials of the prior art.

Ribbon samples of the as quenched materials described above, without further processing, exhibit remanent magnetization, $M_r$, greater than 8 kilogauss, coercive force, $H_c$, greater than 8 kilooersteds, and preferably greater than 11 kilooersteds, and maximum energy product (BH)max greater than 15 megagaussoersteds with similar values measured in all directions, i.e., in the plane of the ribbon and perpendicular to the plane of the ribbon. In the latter case the value was obtained after a standard correction (a geometric demagnetization factor as described, for example, in R. M. Bozorth, *Ferromagnetism*, D. VanNostrand Co., New York, (1951), at pages 845–847) for the shape anisotropy of the ribbon.

The saturation magnetization $M_s$ of the ribbon, i.e., the magnetization in the limit for large applied fields, e.g., an applied magnetic field above about 50 kilogauss, is 15 to 16 kilogauss, also in all directions. In order to directly measure saturation magnetization, $M_s$, the applied field should be at least three times the coercive force, $H_c$. Alternatively, the value of $M_s$ can be estimated based on the values thereof for compositionally similar materials. The values correspond to a value of $M_r/M_s$ greater than 0.5, and a magnetic retention parameter, Q, greater than 0.75, in contradistinction to the clear teachings of the prior art for a macroscopically isotropic, non-interacting material.

Typical magnetic parameters for the magnetic alloys described in the above incorporated patent application are as shown in Table I of U.S. application Ser. No. 893,516, filed Aug. 5, 1986, Table V of U.S. patent application Ser. No. 816,778. (An $M_s$ of 16 kilogauss was used.)

As can be seen from Table I of U.S. application Ser. No. 893,516, the samples of the materials described therein exhibit superior relevant magnetic parameters throughout the volume of the bulk solid, evidencing Interaction between grains. The properties are especially superior when compared with the properties of the isotropic materials of the prior art listed in Table III of U.S. application Ser. No. 816,778. When compared with the anisotropic prior art materials listed in Table IV of U.S. application Ser. No. 816,778, the samples of the inventions described in the aforementioned U.S. patent application Ser. Nos. 816,778 and 893,516 (filed Aug. 5, 1986) exhibit comparable but isotropic magnetic properties, and were prepared without the costly, complicated alignment steps necessary in the prior art.

The magnetic alloy materials of U.S. application Ser. Nos. 816,778 and 893,516 filed Aug. 5, 1986 have been prepared by the melt spinning process, and more particularly by the free jet casting process.

In the free jet casting process jet of molten metal is expelled under a head of inert gas from a crucible onto a rapidly rotating chill wheel. This jet of molten metal forms a puddle of molten metal on a rapidly rotating chill wheel. The top of the puddle appears to stand stationary beneath the orifice of the crucible, while the bottom of the puddle appears to be continuously drawn away from the crucible orifice. We have observed an instability associated with the interaction between the chill wheel and the puddle. This instability is associated with a high degree of variance of magnetic properties of the cast products and a concomitant low yield of enhanced remanence magnetic alloy material.

SUMMARY OF THE INVENTION

These instabilities of the free jet casting process and the associated low yields of enhanced remanence magnetic material are obviated by the method of this invention.

The magnetic material is prepared by a two step solidification, heat treatment process. The solidification process yields a very low coercivity material, characterized as being one or more of amorphous, microcrystalline, or polycrystalline. The grains within the solid have, at this stage of the process, an average grain characteristic dimension less than that of the heat treated magnetic material, and too small to provide a practical coercivity or an enhanced remanence.

The solidification process is carried out by polymerization i.e., condensation of alloy material from the vapor phase in a microwave plasma, i.e., by growing a condensed and/or polymerized product in the microwave enhanced plasma. We refer to this solid product as microwave powder or snow. The microwave product is grown by introducing a reaction gas comprised of precursor compounds of the magnetic material into a substantially enclosed reaction vessel. The reaction gas is energized by providing a source of microwave energy coupled to the substantially enclosed reaction vessel while maintaining the reaction gas pressure and/or the microwave power high enough to form powdery microwave solid product, i.e., microwave condensate, polymerizate, or "snow."

In the second, or heat treating, stage of the process, the atomized solid particles are heat treated to form a solid material having a morphology that provides a practical coercivity and the above described enhancement of remanence. The heat treated solid is comprised of grains meeting at grain boundaries. The grains and grain boundaries have the morphology of the enhanced remanence magnetic material.

THE FIGURES

The invention may be understood by reference to the following figures.

DETAILED DESCRIPTION OF THE INVENTION

Figure 1:
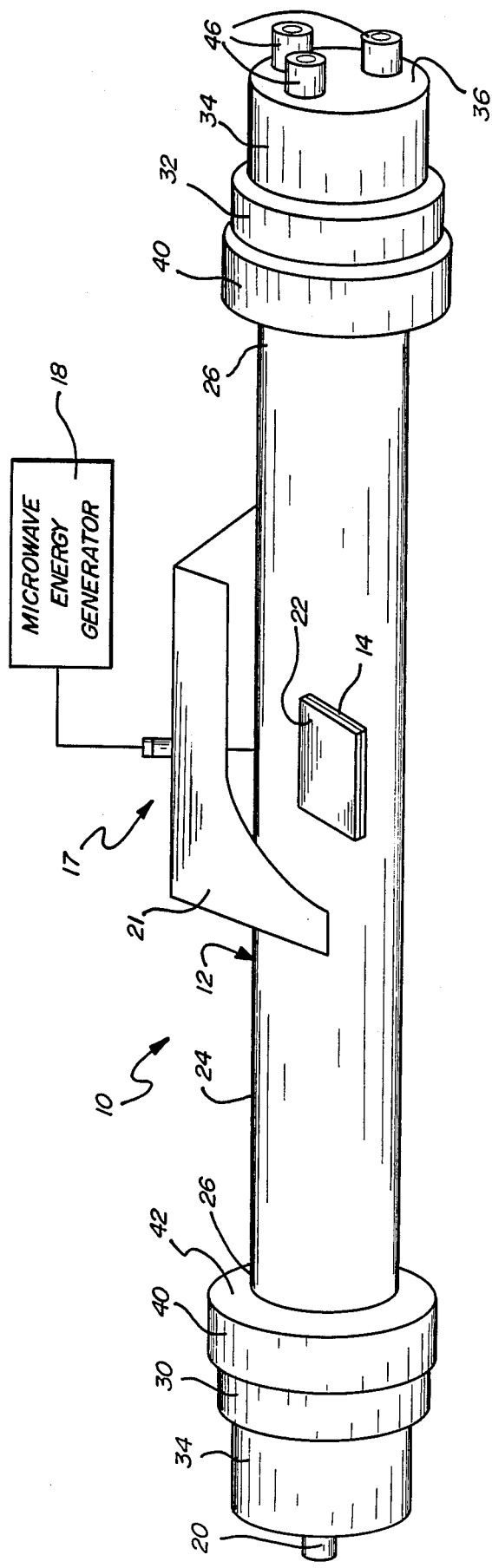
FIG. 1 is a partial cutaway view of a microwave particle growth chamber useful in practising the invention.

According to the invention there is provided a method of forming a class of magnetic alloy materials having superior magnetic properties. These magnetic alloy materials are high remanence materials that do not obey the Stoner and Wohlfarth assumptions of non-interacting particles. To the contrary, the individual grains or crystallites interact across grain boundaries and have enhanced magnetic properties that give clear evidence of interaction across grain boundaries of individual grains or crystallites.

The alloys prepared by the method herein are substantially crystallographically unoriented, substantially magnetically isotropic alloy, with interaction between adjacent crystallites. By substantially isotropic is meant a material having properties that are similar in all directions. Quantitatively, substantially isotropic materials include those materials where the remanence along all three orthogonal axis, after application of the appropriate geometric demagnetization factor, are interactively enhanced, i.e., greater than 8 kilogauss, as well as those material where the average value of [Cos(theta)], defined above, is less than about 0.75 in all directions, where Cos(theta) is averaged over all the crystallites. Microscopically this means that the direction of the easy axis of magnetization is substantially random and, substantially uncorrelated from grain to grain.

The materials are permanent (hard) magnets, with isotropic magnetic parameters, i.e., isotropic maximum magnetic energy products greater than 15 megagaussoersteds, magnetic retention parameters, Q, greater than 0.75, standard temperature coercivities greater than about 8 kilooersteds, and remanences greater than about 9 kilogauss, and preferably greater than above about 11 kilogauss.

The saturation magnetization $M_s$ of the ribbon, i.e., the magnetization in the limit of large applied fields, is 15 to 16 kilogauss, also in all directions. These values correspond to a value of $M_r/M_s$ greater than 0.5, and a magnetic retention parameter, Q, greater than 0.75, in contradistinction to the clear teachings of the prior art for a macroscopically isotropic material.

The magnetic material is composed of an assembly of small crystalline ferromagnetic grains.

The grains are in intimate structural and metallic contact along their surfaces, i.e., along their grain boundaries.

That is, one grain of the material is in direct contact with an adjacent grain of the material at a grain boundary that is substantially free of intergranular materials and/or phases. This is contradistinction to the clear teachings of Raja K. Mishra, "Microstructure of Melt-Spun Nd-Fe-B Magnequench Magnets," Journal of Magnetism and Magnetic Material, Vol 54–57 (1986), pages 450–456 who teaches the necessity of a 10–20 Angstrom thick film of Nd-rich, B-lean phase, $Nd_2Fe_{14}B_1$ grains. Mishra reports that this film is necessary as a pinning site for magnetic domain walls. By way of contrast, according to the instant invention grains of magnetic material are in direct contact with adjacent grains of magnetic material, e.g., grains of $Nd_2Fe_{14}B$ are in direct contact with adjacent grains of $Nd_2Fe_{14}B$.

The degree of magnetic enhancement is determined by the average characteristic dimension of the grains, $R_o$, the size distribution of the individual grain dimensions relative to this characteristic scale, and a characteristic dimension of the grain boundaries. The characteristic dimension of the grain boundaries must be small enough to allow interaction between grains across the grain boundaries.

The magnetic alloys are solidified or quenched to produce a precursor microstructure, which, when appropriately heat treated, results in a structure having these dimensions and morphologies and therefore exhibiting the above described improved magnetic parameters. These initially solidified particles much larger then the characteristic grain dimension $R_o$. A particle may contain at least $10^8$ grains of characteristic grain size $R_o$.

The as heat treated dimensions and morphologies are critical in obtaining the enhanced remanence and magnetic retention parameters herein contemplated.

While the illustrations of the interaction across grain boundaries in Ser. No. 893,516 have been quantitatively described with respect to rare earth-transition metal-boron materials of tetragonal, $P4_2/mnm$ crystallography, especially the $Nd_2Fe_{14}B_1$ type materials, this is a general phenomenon applicable to other systems as well. The optimum characteristic grain dimension $R_o$, however, may be different in these other cases.

We expect that for $Pr_{2-x}Nd_xFe_{14}B_1$, $R_o$ will be approximately 200 Angstroms for all values of x. For $SmCo_5$, for example, where Curie temperature, $Tc=900°$ K., saturation magnetization, $Ms=12$ kG, and Hanisotropy$=300$ kOe, H(spin,spin)$=9$ MOe, so that $R_o=(9MOe)/(300kOe)\times 2.5$ Angstroms$=$(approximately) 80 Angstroms. Similarly, for $Sm_2Co_{17}$ $R_o=(1-2MOe)/(80kOe)2.5$ Angstroms$=$(approximately) 400 Angstroms.

For randomly-oriented crystallites at the optimum size, the expected magnetic enhancement attributable to quantum mechanical magnetic coupling is comparable to that estimated above for $Nd_2Fe_{14}B$ type material —an increase in $BH_{max}$ by a factor of 2 to 3 above that predicted by the Stoner and Wohlfarth model, above.

The magnetic material is prepared by a two step solidification, heat-treatment process. The solidification process yields a very low coercivity material, characterized as being one or more of amorphous, microcrystalline, or polycrystalline. The crystallites within the solid have, at this stage of the process, an average grain characteristic dimension less than that of the optimally heat treated magnetic material, and too small to provide a practical coercivity.

The solidification process is carried out by forming a solid in a microwave plasma, i.e., by a condensation and/or a polymerization process, which we refer to herein as growing microwave powder or snow. The microwave powder or snow is grown by introducing a reaction gas comprised or precursor compounds of the magnetic material into a substantially enclosed reaction vessel. The reaction gas is energized by providing a source of microwave energy coupled to the substantially enclosed reaction vessel while maintaining the reaction gas pressure high enough to form the powdery microwave precipitate, i.e., microwave snow.

In accordance with the invention, the method of forming the low coercivity, fine grain material includes the steps of providing a source of microwave energy, coupling the microwave energy into a substantially enclosed reaction vessel where the condensed, low coercivity alloy is to be formed and introducing into the vessel at least one reaction gas and evacuating the vessel to a low enough alloy condensation pressure to condense the low coercivity alloy at high condensation or growth rates with high reaction gas conversion efficiencies. The microwave energy and the reaction gases form a glow discharge plasma within the vessel to condense and grow the low coercivity fine grain alloy from the reaction gases.

The reaction gases may include submicron particles of compounds of the metals, as neodymium and/or praseodymium halides, and iron halides, or volatile compounds of the metals. Additionally, gaseous boron compounds are present, as borane or boron trichloride.

The microwave plasma provides a source of free radicals, e.g., hydrogen free radicals, to reduce the precursor compounds. Independent control over all of the condensation and growth parameters can be obtained by separately generating the free radical species prior to combination in the microwave plasma. For example, atomic fluorine, alkali metals (as Li, Na, K, Cs, and Rb, and esp. Na, and K), alkaline earth metals (esp. Mg, Ca, Sr, and Ba), and/or hydrogen can be separately generated and fed into the plasma wherein the low coercivity alloy component free radicals are generated. The foregoing thereafter react in the plasma and are condensed to form low coercivity alloys. The alloy component free radicals can be generated from any of the compounds previously mentioned.

Referring now more particularly to FIG. 1, a microwave deposition apparatus suitable for practicing the process of the present invention is generally designated 10. The apparatus 10 comprises a chamber or vessel 12. Reaction gases passing from inlets 46 to an outlet 20 at opposite ends of the chamber 12 receive microwave energy from the source 17. The combination of the reaction gases and the microwave energy from source 17 causes the formation of a plasma, resulting in the condensation and growth of the alloy particles. In accordance with the present invention, the reaction gases include at least one precursor compound to form the plasma. The frequency of the microwave energy is in the gigahertz range, and can economically be 2.45 GHz and above and preferably 2.45 GHz. As mentioned, the combined microwave energy and the reaction gases form the plasma to permit the condensation and growth process to proceed.

Referring now to FIG. 1 in greater detail, the chamber 12 comprises a central portion 24 and end portions 26 are closed by a pair of end fittings 30 and 32 to complete the chamber. Each of the end fittings includes a sleeve portion 34 extending from a closed end 36 to an open end portion. The open end portion is threaded to receive a collar 40 having a inwardly extending annular flange 42 at one end thereof. An o-ring (not shown) is confined in a space between the flange 42 and the end portion for compression thereof against the quartz portion 26. An airtight seal is provided in this way between the end fittings 30 and 32 and the tubular chamber 12.

The end fittings 30 and 32 are preferably made of stainless steel or other suitable noncorrosive metal, with the closed ends 36 being welded or otherwise permanently joined to the sleeve portions 34. The closed end 36 of the end fitting 32 is provided with gas inlets 46 through which the precursor reaction gases are introduced into the vessel 12. An inert gas such as argon can be introduced through one inlet 46 to assist in sustaining the plasma.

The gas inlets 46 are preferably connected to a conventional gas rack (not shown) for establishing regulated flows of reaction gases therein. The outlet 20 is provided at the closed end 36 to the end fitting 30 for connection to selectable first and second pumps. The first pump provides for initial evacuation of the chamber. The second pump provides withdrawal of unused reaction gases during operation and maintenance of the proper deposition pressure of 0.1 Torr or less.

The microwave energy source 17 preferably comprises a microwave energy generator 18 coupled to an antenna 19. The antenna 19 is housed within a reflective housing 21 for concentration of the microwave energy into the chamber 12. The antenna as illustrated is a vertical antenna being preferably one-quarter wavelength long. The tip of the antenna just touches the outer surface of the vessel 12 to maximize transmission of its output to the reaction gases.

In operation, the system 10 is first pumped down to below a desired condensation and growth pressure, such as $10^{-5}$ Torr. The reaction gas mixture of gases such as neodymium iodide and/or praseodymium iodide, iron chloride, and borane or boron trichloride are fed into the inlet chamber 24 through separate inlet conduits 46 and chamber 12 is brought up to the desired operating pressure. To the foregoing reaction gases, hydrogen, as a source of free radials, can be added.

The microwave energy from the antenna 19 is directed by the reflective housing 21 into the vessel 12 to form a plasma. As a result, droplets of a fine grained, low coercivity alloy of the magnetic material condense and grow.

The output power of the microwave energy generator 18 is adjusted and controlled as a function of the volume of the gas contained in the plasma, the pressure of the gas, and the composition of the gas to fit a Paschen curve relationship curve for plasma phase condensation and/or polymerization. With the proper system parameters, high alloy production rates, as controlled by the microwave energy, gas pressure, gas composition, and gas flow rate can be obtained. By proper choice of these parameters, the reaction gas may be converted to deposition species at a conversion efficiency of essentially 100%.

To assist in the maintenance of the plasma, plasma sustaining gas can be introduced into one of the gas inlets 46. Argon gas can be utilized. The microwave power is maintained high enough to establish and maintain the plasma with a high concentration of excited species therein and a high collision rate for the excited species. This collision rate is high enough to result in alloy droplet condensation and growth.

These droplets, i.e., powders or microwave snow of low coercivity material collect or are collected for the second or heat treating step. While the invention has been described with respect to microwave assisted plasmas, other reducing plasmas may be used to form the polymerizate, condensate, precipitate, or the like.

In the second, or heat treating, stage of the process, the solid particles of low coercivity, fine grained material are heat treated to form a solid material having a morphology that provides a practical coercivity and the above described enhancement of remanence. The heat treated solid is comprised of grains meeting at grain boundaries. The grains and grain boundaries have the above described morphology associated with the enhanced remanence magnetic material.

Figure 2:
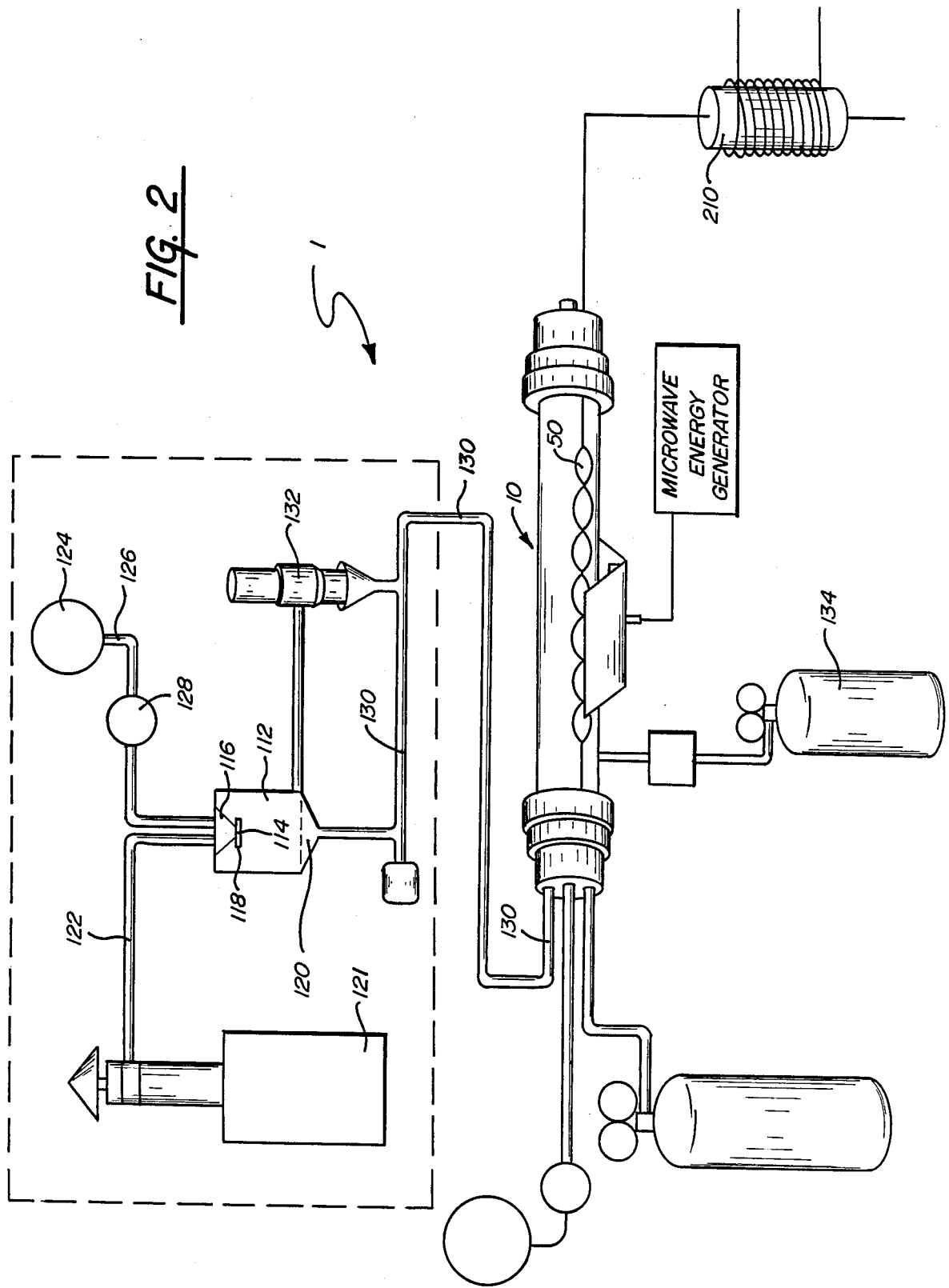
FIG. 2 is a schematic view of an integrated system for practising the invention, including a spray dryer, a microwave particle growth apparatus, and an induction furnace.

Referring now to FIG. 2, an integrated system useful for practising the method of the invention is designated 1. The integrated system comprises microwave apparatus 10, atomization apparatus 110, and heating apparatus 210.

The atomization apparatus 110 comprises a spray dryer 112. The spray dryer 112 has a generally cylindrical body portion with a liquid atomizer 114 and a hot air inlet 116 at the top. The hot air and the liquid impact a spray disk 118. The spray disk breaks the liquid stream into droplets (not shown), which fall through the spray dryer 112 to the particle outlet 120, where they are recovered as solids.

The size and size distribution of the falling droplets are governed by well understood design parameters relating to the hot gas and liquid flow rates, the atomizer 114, the spray disk 116, and the height of the dryer 112.

Hot gas is supplied to the spray dryer 112 from a hot gas source as furnace 121 through air line 122. The aqueous solution of precursor salts is supplied to the spray dryer from liquid tank 124 through line 126 and pump 128.

Most of the solids are collected at the bottom of the dryer 112 and recovered through particle outlet 120. The particles are tranported by transport regions, e.g., spiral conveyor 130, to the microwave apparatus 12.

Additionally, some of the solids are recovered from the hot, moist gas by cyclone 132.

The solids, e.g., $NdI_3$ or $PrI_3$, and $FeCl_3$, are conveyed to the microwave apparatus 10, and introduced therein as a mist. The boron trichloride is stored in tank 134 and vaporized prior to or upon entry into the microwave apparatus 10.

The operation of the microwave apparatus 10 is as described above, with the particles of low coercivity alloy being recovered, e.g., by conveyor means 50. The particles may be recovered through gas gates, not shown, or at the end of the run.

The particles of the low coercivity alloy are introduced into a means for uniform and controllable heating, as induction furnace 210. In the induction furnace grains are nucleated, and grain growth is initiated and propagated whereby to provide the grain size, size distribution, or morphology for enhanced remnance.

While the invention has been described with respect to spray drying, induction heating, and a single heat treating means for grain nucleation and grain growth, it is to be understood that other apparatus and techniques may be used. For example, other methods of drying may be used. Similarly, other methods may be used for nucleation and grain growth, with nucleation and grain even occuring through action of separate agencies and/or in separate steps.

In one exemplification the magnetic alloy material is an alloy of iron, optionally with other transition metals, as cobalt, a rare earth metal or metals, boron, and, optionally, a modifier. In another exemplification the magnetic alloy material is an alloy of a ferromagnetic transition metal as iron or cobalt, with an lanthanide, as samarium, and, optionally, a modifier.

A modifier is an alloying element or elements added to a magnetic material which serve to improve the isotropic magnetic properties of the resultant material, when compared with the unmodified material, by an appropriate processing technique. The modifier acts as a grain refining agent, providing a suitable distribution of crystallite nucleation sizes, thereby providing morphologies to enhance interactions. Exemplary modifiers are silicon, aluminum, and mixtures thereof. Alternative or additional modifiers may include lithium, hydrogen, fluorine, phosphorous, sulfur, germanium, and carbon.

The amount of modifier is at a level, in combination with the quench parameters, to give the above described isotropic magnetic parameters.

While the alloys referred to herein have modifiers, which are believed to control grain nucleation and growth, the crystallite size and size distribution may be obtained by proper choice and control of the solidification technique employed, even without modifiers. For example, such solidification methods as gas atomization, metallization, chemical vapor deposition, and the like may be used as an alternative to rapid solidification from the melt. The modifier acts during solidification from the liquid state, or during grain nucleation and growth from the amorphous state, e.g., as a grain refining agent or a nucleating agent, to provide the distribution of crystallite size and morphology necessary for enhanced properties.

When modifiers are indicated as being present, it is to be understood that other means of providing nucleation sites and/or obtaining uniform grain size may be used.

The magnetic alloy may be of the type

[Rare Earth Metal(s)]-[Transition Metal(s)]-[Modifier(s)], for example

[Sm]-[Fe, Co]-[Si, Al].

Another interacting alloy may be of the type

[Rare Earth Metal(s)]-[Transition Metal(s)]-Boron-[modifier(s)], for example

[Rare Earth Metal(s)]-[Fe,Co]-Boron-[modifier(s)], and [Rare Earth Metal(s)]-[Fe,Co,Mn]-Boron-[modifier(s)].

In one exemplification, the magnetic alloy material has the stoichiometry represented by:

$(Fe,Co,Ni)_a(Nd,Pr)_bB_c(Al,Si)_d$, exemplified $Fe_a(Nd,Pr)_bB_c(Al, Si)_d$, where a, b, c, and d represent the atomic percentages of the components iron, rare earth metal or metals, boron, and silicon, respectively, in the alloy, as determined by energy dispersive spectroscopy (EDS) and wave length dispersive spectroscopy (WDS) in a scanning electron microscope;

a+b+c+d=100;

a is from 75 to 85;

b is from 10 to 20, and especially from 11 to 13.5;

c is from 5 to 10;

and d is an effective amount, when combined with the particular solidification or solidification and heat treatment technique to provide a distribution of crystallite size and morphology capable of interaction enhancement of magnetic parameters, e.g., from traces to 5.0.

The rare earth metal is a lanthanide chosen from neodymium and praseodymium, optionally with other lanthanides (one or more La, Ce, Sm, Eu, Gd, Tb, Dy, Ho, Er, Tm, Yb and Lu), Sc, Y, and mixtures thereof present. While various combinations of the rare earth metals may be used without departing from the concept of this invention, especially preferred rare earth metals are those that exhibit one or more of the following characteristics: (1) the number of f-shell electrons is neither 0 (as La), 7 (as Gd) or 14 (as Lu), (2) low molecular weight lanthanides, such as La, Ce, Pr, Nd, and Sm, (3) high magnetic moment lanthanides that couple ferromagnetically with iron, as Nd and Pr, or (4) relatively inexpensive lanthanides, as La, Ce, Pr, and Nd. Especially preferred are Nd and Pr. Various commercial and/or byproduct mischmetals may be used. Especially preferred mischmetals are those rich in Nd and/or Pr.

While the invention has been described with respect to certain preferred exemplifications and embodiments thereof, it is not intended to limit the scope of the invention thereby, but solely by the claims appended hereto.

We claim:

1. A method of forming a magentic alloy material comprising a mass of solid grains of a rare earth metal, a transition metal, and boron, which method comprises the steps of:
    (a) introducing a reaction gas comprised of precursor compounds of the magnetic material into a substantially enclosed reaction vessel;
    (b) providing a source of microwave energy coupled to the substantially enclosed reaction vessel;
    (c) maintaining the reaction gas pressure high enough to form a powdery microwave polymerizate having a morphology characterized by one or more of
        (i) amorphous;
        (ii) microcrystalline; and
        (iii) polycrystalline;
    wherein the grains thereof have an average grain characteristic dimension less than that of the optimal enhanced remanence magnetic material; and
    (b) heat treating the powdery microwave polymerizate to form a solid material comprised of grains meeting at grain boundaries, the grains and grain boundaries having the morphology of the magnetic material, the grains and grain boundaries being characterized by;
        (i) the grains having an average grain characteristic dimension;
        (ii) individual grains have an easy axis of magnetization and an individual grain characteristic dimension within a distribution about the average grain characteristic dimension; and
        (iii) the grain boundaries having a characteristic dimension small enough to allow interaction between adjacent grains across the grain boundaries; and
        (iv) wherein the individual grains have a characteristic dimension, $R_o$, such that the grain-grain interaction between adjacent grains in the heat treated magnetic material substantially equals the magnetic anostropy field of the individual grains; and the material has magnetic properties comprising:
            (a) a maximum magnetic energy product, $(BH)_{max}$, greater than 15 megagaussoersteds; and
            (b) a remanence greater than 8 kilogauss.

2. The method of claim 1 comprising forming the reaction gas by:
   (a) forming a solution of salts of precursors of the alloy in a solvent;
   (b) evaporating the solvent to form a mist of the salts of precursors of the alloy; and
   (c) contacting the mist with gaseous $BCl_3$; and forming the microwave polymerizate by:
   (a) passing the mist of precursor salts and $BCl_3$ into a reducing plasma whereby to form metal vapor; and
   (b) condensing the plasma formed in the vapor whereby to form a fine grain condensate of the magnetic alloy material.

3. The method of claim 2 wherein the salts are halide salts.

4. The method of claim 1 wherein the plasma comprises reducing agents chosen from the group consisting of hydrogen, alkali metals, and alkaline earth metals.

5. The method of claim 1 comprising maintaining the gas concentration in the plasma high enough to maintain the plasma and form magnetic alloy particles therein but low enough to avoid quenching the plasma.

6. The method of claim 1 wherein the magnetic surface exchange energy between adjacent grains of the heat treated magnetic material is strong enough to magnetically align the gain away from its easy axis of magnetization.

7. The method of claim 1 wherein the anostropy energy of the individual grains of the heat treated magnetic material is strong enough to result in a coercivity above about 8 kilooersteds.

8. The method of claim 1 wherein the magnetic alloy material has the nominal composition $RE_2TM_{14}B_1$, where RE represents a rare earth metal or metals, and TM represents a transition metal or metals.

9. The method of claim 8 wherein the rare earth metal is chosen from the group consisting or praseodymium and neodymium.

10. The method of claim 8 wherein the transition metal is chosen from the group consisting of iron, cobalt, and nickel.

11. The method of claim 8 wherein the magnetic material further comprises one or more modifiers.

12. The method of claim 11 wherein the modifier is chosen from the group consisting of aluminum and silicon.

13. The method of claim 11 wherein the modifier is a grain refining agent.

14. The method of claim 13 wherein the grain refining agent modulates the competing rates nucleation and grain growth to provide a solid, heat treated magnetic material with a characteristic grain dimension, $R_o$, of about 200 Angstroms, and a distribution about the characteristic dimension to substantially avoid the effects of low coercivity and multidomain grains.

15. The method of claim 8 wherein the heat treated magnetic material consists essentially of a tetragonal phase of $P4_2/mnm$ crystallography.

16. The method of claim 15 wherein the tetragonal phase has the nominal composition:

$$Fe_a(Nd,Pr)_bB_c(Si,Al)_d$$

where
$75 < a < 85$,
$10 < b < 20$,
$5 < c < 10$, and
$0 < d < 5$.

* * * * *